UNITED STATES PATENT OFFICE 2,644,133

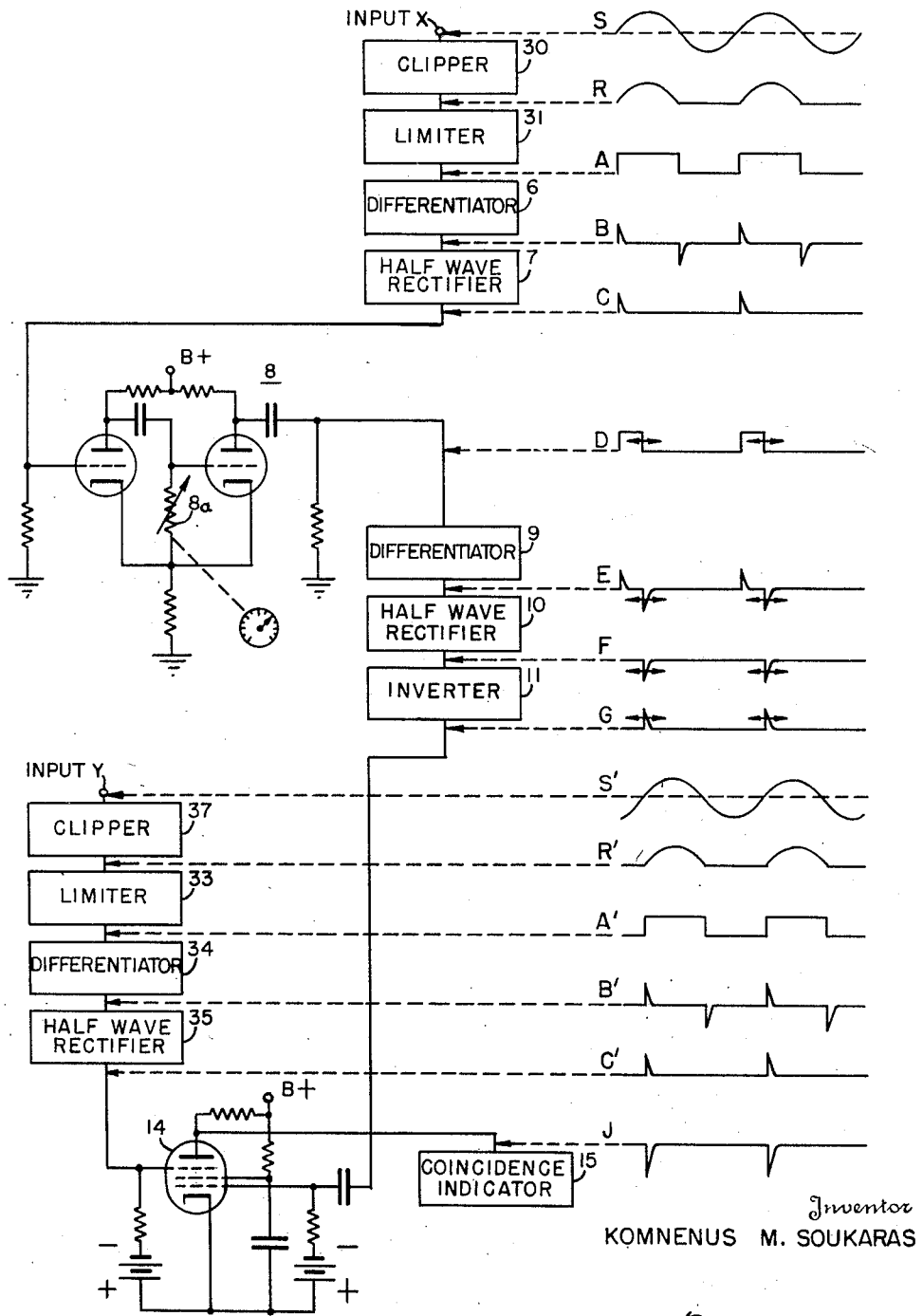

PHASE COMPARING SYSTEM

Komnenus M. Soukaras, Miami, Fla.

Original application July 22, 1947, Serial No. 762,779. Divided and this application April 7, 1950, Serial No. 154,705

4 Claims. (Cl. 324—68)

(Granted under Title 35, U. S. Code (1952), sec. 266)

This invention relates generally to phase comparing systems and more particularly to an electronic system responsive to the phase relation of two voltage waves. This application is a division of my copending application Ser. No. 762,779, filed July 22, 1947, and issued August 14, 1951, as U. S. Patent No. 2,563,879.

This invention is particularly applicable to measuring the phase relation of two signals having the same frequency. These signals may or may not be sinusoidal, or they may be pulse signals having the same recurrence frequency but not necessarily the same width. Although operable with recurrent signals this invention may also be used to measure the time relation of two separate single pulses.

With any of the above signal pairs this invention is equally capable of discriminating between signal pairs not having a selected phase relationship. Prior art phase determining techniques lacks the precision and simplicity offered by the invention herein disclosed.

It is an object of this invention to provide a precision method and means for sensing the phase relation of two signals.

It is another object of this invention to provide precision method and means for sensing the phase relation of two voltage waves having the same recurrence frequency.

Other objects and advantages of the invention will be apparent from the following description and accompanying drawing, wherein the single figure illustrates by block and schematic diagram an exemplary embodiment of this invention. In the drawing the action of the circuit upon a pair of sinusoidal signals is shown by oscillogram.

Briefly, this invention determines the phase relation of a pair of signals by clipping, squaring, and differentiating each signal to produce a sharp pulse representative of a corresponding point in time of each signal, producing a variably delayed pulse in response to one of the sharp pulses, and adjusting the amount of delay to obtain coincidence between the delayed pulse and the other sharp pulse. The phase relation is measured by the adjustment.

The invention may be better understood by reference to the drawing in detail. The diagram shows an embodiment of the invention adapted to measure or discriminate according to the phase relation of a pair of separate signals each of which may comprise a nonrecurring voltage variation or similar voltage variations recurring at the same frequency such as sinusoidal signals of the same frequency. As will be further explained below, only the phase discrimination feature of this invention is effective with nonrecurring signals.

The oscillograms accompanying the diagram show a pair of sample sine wave signals S and S' which have the same frequency but different phase. Signal S is applied to input X and passed to a clipper stage 30. Clipper stage 30 may be a half wave rectifier or any other known clipping device suitable to permit only the positive half of the signal X to appear at the clipper output as shown by oscillogram R. These positive half sine waves are then squared up by a limiter circuit 31, which may typically be an amplifier operating near saturation, to produce a uniform square wave, oscillogram A. This square wave is differentiated at 6 to produce positive and negative pulses, oscillogram B, corresponding to the leading and trailing edges of the output wave from limiter 31 and to 0° and 180° phase points of the input sine wave S. Thereafter the differentiated output from 6 is applied through a half wave rectifier 7 to remove the negative pulses as shown in oscillogram C. The remaining positive pulses of oscillogram C are applied to the trigger grid of a one shot multivibrator 8 for producing in response to each input pulse, an output pulse of variable length.

Multivibrator 8 is of conventional design possessing a stable state when the left hand tube is blocked and the right hand tube conducting and an unstable state when the conducting condition of the tubes are reversed. The latter condition occurs responsive to an output from rectifier 7 and persists for a period of time which is controllable by variable resistor 8a. During this state a positive pulse of controllable duration as indicated by oscillogram D is produced at the plate of the right hand tube. Said variable pulse D is differentiated by block 9, the differentiated pulses E produced thereby consist of a positive pulse coincident with the leading edge and a negative pulse coincident with the trailing edge of said multivibrator variable output pulse D.

The differentiated pulses E are rectified or clipped such as by half wave rectifier 10 to eliminate the positive pulses and retain only negative pulses, oscillogram F, whose position in time is controlled by the multivibrator variable resistor 8a which controls the length and hence the time position of the trailing edge of the multivibrator output pulse D. Said negative pulses are applied to an inverter 11 which may be a conventional single stage vacuum tube amplifier. The resultant positive variable time pulses G are applied to one grid of a coincidence tube 14. Said pulses G are in effect equivalent to the pulses C delayed in time by the length of the multivibrator pulses D. The coincidence tube 14 is a multi-grid tube such as the pentode shown having both its control and suppressor grids negatively biased so that simultaneous inputs to each grid are necessary to produce an output.

Signal S' is applied to input Y and passed to a second clipper 37 where the negative half sine wave is removed, oscillogram R'. The remaining positive half sine wave is applied to a second limiter 33 whose output is a square wave A' identical to A but having the phase relation of signal S'. This square wave is differentiated by a differentiator 34 to produce an output B' having a sharp positive pulse coincident with the leading edge and a sharp negative pulse coincident with the trailing edge of the output A' of the limiter 33. These differentiator produced pulses correspond to the 0° and 180° phase points of the second input sine wave S'. Of these differentiated pulses the negative ones are removed by a half wave rectifier 35 whose output C' is applied to the other grid of the said coincidence tube 14. When the inverter 11 variable time output G coincides in time with the half wave rectifier 35 output C', an output J will appear in the plate circuit of the coincidence tube 14. The output J may be used to operate the coincidence indicator 15 or to control or trigger other apparatus as desired.

For this condition to obtain it is required that the variable multivibrator resistor 8a be adjusted so that the multivibrator output pulse D has a length equivalent in time to the phase separation between signals S and S'. In the oscillograms shown in the drawings the proper output pulse length is shown.

It will be seen then that by calibrating the variable resistor 8a as shown in the drawing, and adjusting this resistor until an output is observed at coincidence indicator 15, the multivibrator output will have attained a pulse length equivalent to the phase relation of signals S and S'. The phase relation of the signals may then be determined from the setting of resistor 8a.

Although a single embodiment of this invention has been herein disclosed and described, it is to be understood that it is merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. A system for comparing the phase of a pair of recurrent electrical signals having the same recurrence frequency comprising, a pair of input terminals each receiving one of said signals, a pair of pulse shaping means each connected to one of said input terminals and producing respectively a first rectangular wave responsive to one signal and a second rectangular wave responsive to the other signal, first and second differentiating means each connected to one pulse shaping means and producing first and second sharp pulses coincident respectively with the leading edges of the first and second rectangular waves, a variable length pulse producing means connected to said first differentiating means, a third differentiating means connected to said variable length pulse producing means and producing a third sharp pulse coincident with the trailing edge of said variable length pulse, a coincidence circuit connected to said second and third differentiating means, and indicating means connected to said coincidence circuit for indicating coincidence between said second and third sharp pulses.

2. A system for comparing the phase of a pair of recurrent electrical signals having the same recurrence frequency comprising, a pair of input terminals each receiving one of said signals, first and second wave shaping means each connected to one of said input terminals and producing respectively first and second pulses responsive to and in time coincidence with the recurrence of said first and second electrical signals, said first and second pulses being of short duration relative to the half period of said signals, a variable time delay means connected to said first wave shaping means and producing a third pulse a variable time after the occurrence of said first pulse, said third pulse having a duration similar to that of said first and second pulses, a coincidence circuit connected to the output of said second wave shaping means and said variable time delay means, and indicating means connected to the output of said coincidence circuit for indicating coincidence between said second and third pulses.

3. A system for comparing the phase of a pair of recurrent electrical signals having the same recurrence frequency comprising, a pair of input terminals each receiving one of said signals, first and second wave shaping means each connected to one of said input terminals and producing respectively first and second pulses responsive to and in time coincidence with the recurrence of said first and second electrical signals, said first and second pulses being of short duration relative to the half period of said signals, a variable time delay means having a calibrated control means for varying the time delay, said time delay means being connected to said first wave shaping means and producing a third pulse a variable time after the occurrence of said first pulse, said third pulse having a duration similar to that of said first and second pulses, a coincidence circuit connected to the output of said second wave shaping means and said variable time delay means, and indicating means connected to the output of said coincidence circuit for indicating coincidence between said second and third pulses.

4. A system for comparing the phase of a pair of recurrent electrical signals having the same recurrence frequency comprising, a pair of input terminals each receiving one of said signals, a pair of pulse shaping means each connected to one of said input terminals and producing respectively a first rectangular wave responsive to one signal and a second rectangular wave responsive to the other signal, first and second differentiating means each connected to one pulse shaping means and producing first and second sharp pulses coincident respectively with the leading edges of the first and second rectangular waves, a variable length pulse producing means having a calibrated control means for varying the pulse length, said pulse producing means being connected to said first differentiating means, a third differentiating means connected to said variable length pulse producing means and producing a third sharp pulse coincident with the trailing edge of said variable length pulse, a coincidence circuit connected to said second and third differentiating means, and indicating means connected to said coincidence circuit for indicating coincidence between said second and third sharp pulses.

KOMNENUS M. SOUKARAS.

References Cited in the file of this patent

UNITED STATES PATENTS

| Number | Name | Date |
|---|---|---|
| 2,403,527 | Hershberger | July 9, 1946 |
| 2,442,123 | Espley et al. | May 25, 1948 |
| 2,513,477 | Gubin | July 4, 1950 |
| 2,573,070 | Stafford et al. | Oct. 30, 1951 |